(12) United States Patent
Solomon

(10) Patent No.: US 7,174,860 B2
(45) Date of Patent: Feb. 13, 2007

(54) DISPOSABLE ANIMAL DIAPER

(75) Inventor: Irving Solomon, Lauderhill, FL (US)

(73) Assignee: Pedigree Perfection, Lauderdale, FL (US)

( * ) Notice: Subject to any disclaimer, the term of this patent is extended or adjusted under 35 U.S.C. 154(b) by 0 days.

(21) Appl. No.: 10/710,411

(22) Filed: Jul. 8, 2004

(65) Prior Publication Data

US 2005/0034687 A1    Feb. 17, 2005

Related U.S. Application Data

(60) Provisional application No. 60/486,051, filed on Jul. 10, 2003.

(51) Int. Cl.
- A01K 23/00 (2006.01)
- A61F 13/15 (2006.01)
- A61F 13/49 (2006.01)
- A61F 13/53 (2006.01)

(52) U.S. Cl. .................. 119/869; 604/385.09

(58) Field of Classification Search ............... 119/869, 119/868; 604/385.09
See application file for complete search history.

(56) References Cited

U.S. PATENT DOCUMENTS

| | | | |
|---|---|---|---|
| 2,539,606 A * | 1/1951 | Bailey | 119/854 |
| 3,211,132 A | 10/1965 | Hersh | |
| 3,817,217 A | 6/1974 | Matuka et al. | |
| 4,095,562 A | 6/1978 | Graham | |
| 4,257,127 A | 3/1981 | Kaupin et al. | |
| 4,290,386 A | 9/1981 | Eiriksson | |
| 4,510,887 A | 4/1985 | Lincoln et al. | |
| 4,527,991 A | 7/1985 | Msarsa | |
| 4,577,591 A | 3/1986 | Wesseldine | |
| 4,649,573 A | 3/1987 | Yen | |
| 4,779,573 A | 10/1988 | Vidal | |
| 4,813,949 A | 3/1989 | O'Rourke | |
| 4,860,900 A | 8/1989 | Forschner | |
| 4,917,683 A | 4/1990 | Thompson | |
| 4,996,949 A | 3/1991 | Wunderman et al. | |
| 5,005,525 A | 4/1991 | Stanton | |
| 5,114,420 A * | 5/1992 | Igaue et al. | 604/385.26 |
| D329,927 S | 9/1992 | Thomas | |
| 5,226,386 A | 7/1993 | Thoma | |
| 5,234,421 A | 8/1993 | Lowman | |
| 5,555,847 A | 9/1996 | Kelly | |
| D383,259 S | 9/1997 | Post | |
| 5,662,640 A | 9/1997 | Daniels | |
| 5,738,047 A | 4/1998 | McNamara | |
| 5,954,015 A | 9/1999 | Ohta | |
| 6,142,105 A | 11/2000 | McKnight | |
| 6,197,011 B1 | 3/2001 | Freitas et al. | |
| 6,368,313 B1 * | 4/2002 | Howard | 604/385.09 |
| 6,557,497 B1 * | 5/2003 | Milligan | 119/850 |
| 6,837,191 B2 * | 1/2005 | Brewington | 119/869 |
| 6,895,901 B1 * | 5/2005 | Howard | 119/869 |
| 6,912,976 B2 * | 7/2005 | Everett | 119/858 |

* cited by examiner

Primary Examiner—Yvonne R. Abbott
(74) Attorney, Agent, or Firm—Malin, Haley & DiMaggio, P.A.

(57) ABSTRACT

An easy-to-manufacture, easy-to-use disposable pet diaper having a lightweight upper portion and an absorbent bottom portion, comprising elongated strips from the upper portion and corresponding slits in the lower portion whereby the diaper may be tied across the back of the pet when used. The diaper is of layered construction, having a superabsorbent portion. The layered construction allows the pet diaper to be constructed in one piece. The diaper also has intersecting slits for holding a pet's tail in place.

27 Claims, 2 Drawing Sheets

DISPOSABLE ANIMAL DIAPER

BACKGROUND OF INVENTION

1. Field of the Invention

The invention lies in a disposable pet diaper and a pattern therefore. More specifically, the diaper is secured around the dog's body using straps that are tied across the back or equivalent means, and has an area for the tail to pass through having a geometry which keeps the tail in place. The invention is also a pattern for a disposable pet diaper.

2. Description of Related Art

Pet owners are increasingly faced with the problem of dealing with generally liquid discharge, such as urine leakage, piddling or puddling of puppies-in-training, older dogs that are incontinent and bitches in heat. To assist with this problem, the only means available, other than cleaning the mess up after the discharge occurs, are cloth panties in which an absorbent pad is inserted, resulting in the messy, unpleasant and unsanitary handling in the disposal of these pads. Moreover, the pet owner is also faced with the equally distasteful handling of the soiled panties.

SUMMARY OF INVENTION

The diaper is so manufactured as to create a superabsorbent zone is a necessary area when the diaper is secured around the animal. The super absorbent zone is a multi layered area of the diaper. The diaper also includes a cross-slit for the pet's tail. The cross-slit is a means for holding the diaper in place on the animal by friction.

When the diaper is removed from the animal, the nature of the diaper is such that the person removing the diaper can gather up the diaper neatly. The person does not have to run the risk of touching the generally liquid discharge through the material of the diaper.

The diaper can be manufactured very cheaply, and economy of manufacture is important in a disposable diaper.

The disposable item comprises an outer layer of plastic, and an inner layer of soft, felt-like material to be placed next to the pet's skin. Within absorbent zones these layers contain a fluid holding material such as cellulose. Within the superabsorbent zone, a super absorbent material such as sodium polyacrylate is placed within layers of cellulose. Preferably, the sodium polyacrylate is placed within one or more chemicals formed in one or more layers of cellulose. Some inexpensive absorbent padding may be added in some embodiments.

In accordance with these and other objects which will become apparent hereinafter, the instant invention will now be described with particular reference to the accompanying drawings.

DETAILED DESCRIPTION

Figure 2:
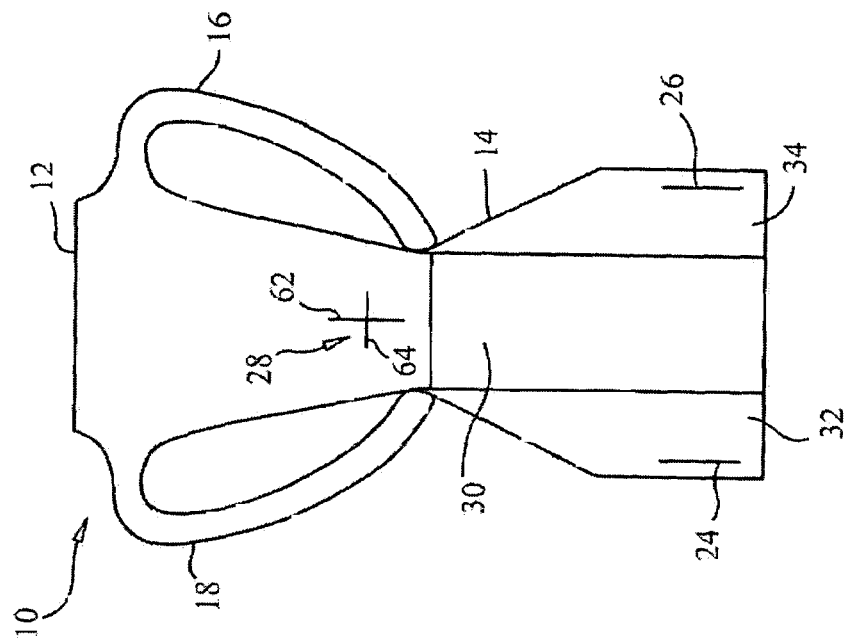
FIG. 2 shows a top view of the invention.
Figure 1:
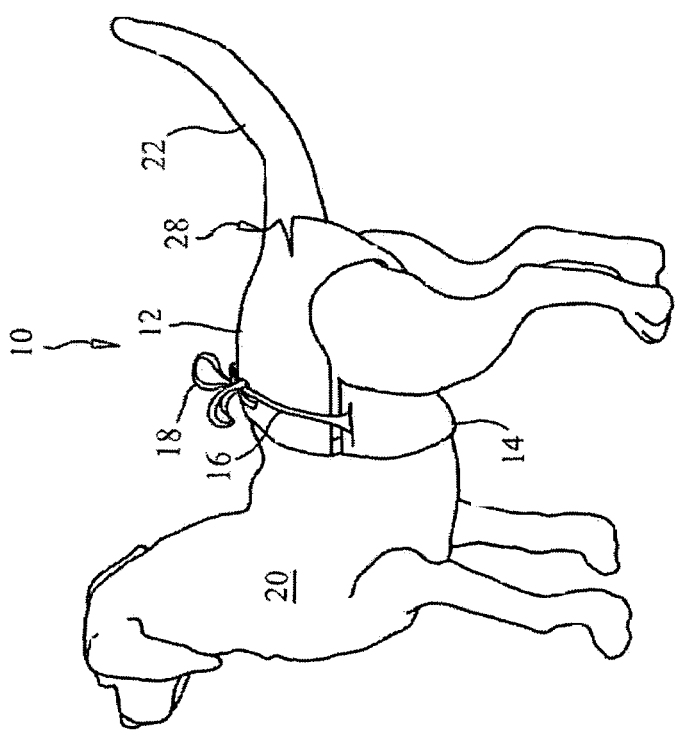
FIG. 1 shows a perspective view of the invention as it is used on a pet.

FIGS. 1 and 2 illustrate the inventive disposable pet diaper 10. As shown in FIG. 1, the pet can be a dog; however, the diaper may be suitable for any animal. Moreover, although the illustrated embodiment shows a pet 20 with a large tail 22, the present invention is usable for a pet that has a small tail or that does not have a tail 20, such as a manx.

The pet diaper 10 is easy-to-manufacture, easy-to-use and disposable. The pet diaper 10 has a lightweight upper portion 12 and an absorbent bottom portion 14. The pet diaper is optimally used for the absorption of generally liquid discharge from a pet. The pet diaper 10 includes a means for securely attaching the diaper to the pet such as strips 16, 18. It is preferred that the strips 16, 18 are elongated and located on each side of the upper portion 12 of the diaper 10, as shown in FIGS. 1 and 2. It is preferred that the strips 16, 18 are arcuate, as shown; however, they may be straight, angled, or of equivalent shape. Also, it may be preferred that the ends of the strips 16, 18 are attached to the body of the diaper as shown in FIG. 2. This configuration makes the diaper easier to handle for the pet owner before placing it on the pet. A spacer piece may also be placed in the area enclosed by the strips 16, 18. The spacer may preferably be perforated so the user may readily detach the strips 16, 18.

As shown, the strips 16 are capable of being attached to one another on the back of the pet, as shown in FIG. 1. Preferably, the strips are able to be tied together; however, they may be glued or attached by hook and loop fastener either to each other or to the top portion of the diaper. Also, by having the strips 16, 18 tied together, the diaper 10 does not require Velcro or any adhesive to be placed on the diaper 10. Thus, manufacture is less expensive.

On the lower portion 14 of the pet diaper, it is preferred that holes such as slits 24, 26 are formed. Multiple slits may be used, or the holes may be round or of other shapes known in the art. The left slit 24 and a right slit 26 are formed on the bottom portion of the diaper. When placed on the pet 20, the slits correspond to the strips 16, 18 so that the strips 16, 18 are passable through the corresponding slits in the bottom portion of the diaper. Thus, the diaper may be cinched across the pet's back, as shown in FIG. 1. In this embodiment, the diaper is a one-piece construction, which is cheap and easy to manufacture.

In general, the lower portion of the diaper is layered to provide optimum absorption and to protect the skin of the pet. Also, the preformed layering makes the diaper easy to manufacture. For some applications, and use with some pets, it may be preferred that the lower portion of the diaper 14 is at least partially rigid. The rigidity and absorption characteristics may both come from the material used, such as cellulose.

Figure 4:
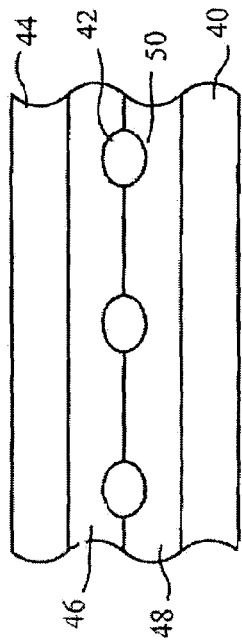
FIG. 4 shows a cross section of the superabsorbent portion of the invention.

It is preferred, but not required, that the lower portion of the pet diaper comprises a central superabsorbent portion 30. The superabsorbent portion, as shown in FIG. 4, preferably includes a plastic outer layer 40, a superabsorbent layer containing superabsorbent material such as cross-linked sodium polyacrylate 42, and a soft layer 44. The superabsorbent material may be a polymer, natural material or equivalent material. The superabsorbent polyacrylate layer preferably lies between an upper means for storing liquid 46 and an outer means for storing liquid 48, such as cellulose or an equivalent material. It is also preferred that the superabsorbent material is placed in elongated channels 50 formed in the lower portion 14 of the diaper 10. The superabsorbent material is preferred to be in generally oval cross-section, but may also be round, or of other equivalent cross section as may be preferred. The superabsorbent material can be channeled as illustrated in FIG. 4 or may be dispersed generally regularly through the superabsorbent area. For optimal protection, it is preferred that the superabsorbent material is located within approximately 5–10 millimeters from the edges of the diaper. It is also preferred that one or more of the layers in the superabsorbent portion are glued together with an adhesive. However, an adhesive is not required, and other means for keeping the layers in place may be used, such as the pressures and/or heating needed in the forming process.

Figure 5:
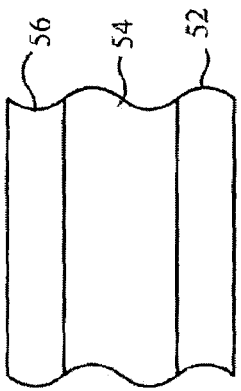
FIG. 5 shows a cross section view of the absorbent portion of the invention.

It may also be preferred that the lower portion 14 of the diaper 10 has left and right absorbent portions 32, 34. These portions 32, 34 preferably are layers glued together like the superabsorbent portion, and comprise a plastic layer 52, a means for storing liquid 54, and a soft layer 56, as shown in FIG. 5. The soft layer is preferably a felt-like material such as felt and its equivalent. The means for storing liquid is preferred to be cellulose or an equivalent as known in the art.

Figure 6:
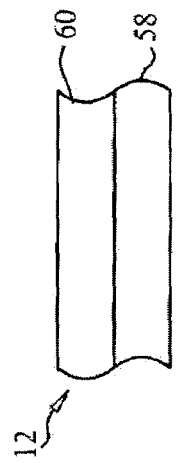
FIG. 6 shows a cross section view of the top portion of the invention.

The upper portion 12 is preferred to include a soft layer 58 and a plastic layer 60, as shown in FIG. 6. The preferred soft layer 58 for the diaper is comprised of unwoven felt-like fabric and the preferred plastic layer for the diaper 10 is comprised of polyethylene. However, equivalent materials are also contemplated.

Figure 3:
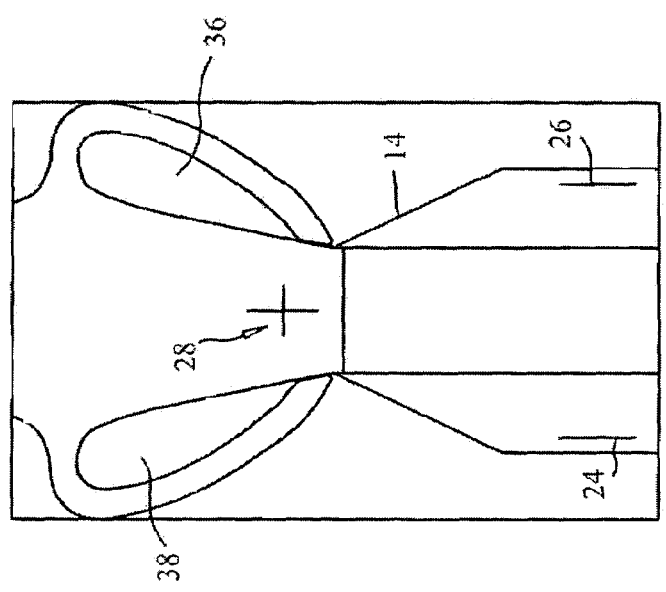
FIG. 3 shows a top view of the pattern of the invention.

In the preferred embodiment, the diaper 10 includes a means 28 for holding the diaper 10 in place around the pet's tail 22. As shown in FIGS. 1–3, multiple slits 62, 64 are overlayed in the top portion 12 to provide a space for a tail 22 to come through the diaper 10. However, other means such as a weakened area or a pop-out section of the diaper in the area where the tail would go or equivalents may be used. It may also be preferred that the hole formed from having a pet's tail pass through the slits 62, 64 is large enough to permit solid excrement to pass through.

Also, as shown, it may be preferred that the upper portion 12 and the lower portion 14 are contoured so that the diaper 10 conforms to the contours of the pet's body.

In addition, the ends of the elongated strips 16, 18 are preferred to be detachably attached to the diaper as shown in FIG. 3. The ends may be only partially cut through, so they can be torn off with a minimum of effort. In the preferred embodiment, the elongated strips are also detachably attached to ear shaped pieces 36, 38 or equivalents that act as spacers between the upper portion 12 and the elongated strips. With the pieces 36, 28, the elongated strips 16, 18 can be easily manufactured in the preferred shape from a pattern as described below. Also, the spacer keeps the shape of the strips after the diaper has been manufactured. However, the ear shaped pieces are not required.

The invention also includes a pattern for a pet diaper, as shown in FIG. 3. The upper and lower portions are shown 12, 14, and the ear shaped pieces described above as shown at 36, 38. The pet diaper 10 is cut from this pattern. In manufacturing, it is preferred that the same layer of soft, felt-like material is used for the inside of the lower portion and the inside of the upper portion. Similarly, it is preferred that the same plastic material is used for the outside of the upper portion and the outside of the lower portion. For the lower portion these layers are glued to inner layers. However, for the upper portion these layers are preferably glued together.

Similarly, the superabsorbent portion may be made of sodium polyacrylate in elongated sections placed between two layers of cellulose, which is in then surrounded by the soft layer and the plastic layer, as shown in FIG. 4. The right and left absorbent portions may be formed by gluing together the cellulose that formed the superabsorbent portion. The absorbent portion is then surrounded by the soft layer and the plastic layer. According to the pattern, slits 24, 26, 62, 64, shown in FIG. 2, are formed as described above. Alternatively, it may be desired to add more cellulose to the superabsorbent portion to give it additional rigidity.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An easy-to-manufacture, easy-to-use disposable pet diaper comprising:
    a lightweight upper portion;
    an absorbent bottom portion;
        wherein said absorbent bottom portion comprises:
            a central superabsorbent portion; and
            left an right absorbent portions;
    means for securely attaching the diaper to the pet; and
    layered means for absorbing generally liquid discharge of the pet, whereby the diaper closely conforms to the contours of the pet's body.

2. The pet diaper of claim 1, wherein the pet diaper comprises a one-piece construction.

3. The pet diaper of claim 1, wherein the means for attaching further comprises a left slit and a right slit on the bottom portion of the diaper.

4. The pet diaper of claim 1, wherein the means for attaching further comprises an elongated strip cm each side of the upper portion of the diaper.

5. The pet diaper of claim 4, wherein the elongated strip is partially detachable from the diaper.

6. The pet diaper of claim 5, wherein the strips are passable through corresponding slits in the bottom portion of the diaper.

7. The pet diaper of claim 6, wherein the strips are capable of being fastened together.

8. The pet diaper of claim 1, further comprising means for holding the diaper around the pet's tail.

9. The pet diaper of claim 1, wherein the upper portion comprises a soft layer and a plastic layer.

10. The pet diaper of claim 9, wherein the soft layer comprises fabric and the plastic layer comprises polyethylene.

11. The pet diaper of claim 1, wherein the bottom portion is at least partially rigid.

12. The pet diaper of claim 1, wherein the superabsorbent portion comprises:
    a plastic layer;
    a sodium polyacrylate layer; and
    a soft layer.

13. The pet diaper of claim 12, wherein the polyacrylate layer lies between an upper means for storing liquid and a lower means for storing liquid.

14. The pet diaper of claim 13, wherein the upper means for storing and the lower means for storing are comprised of cellulose.

15. The pet diaper of claim 13, wherein the superabsorbent portion comprises glued layers.

16. The pet diaper of claim 15, wherein the means for storing are comprised of cellulose.

17. The pet diaper of claim 12, wherein the sodium polyacrylate is formed into elongated channels.

18. The pet diaper of claim 12, wherein the left and right absorbent portions each comprise glued layers.

19. The pet diaper of claim 1, wherein the absorbent portion comprises:
   a plastic layer;
   a means for storing liquid; and
   a soft layer.

20. The pet diaper of claim 19, wherein the soft layer comprises a felt-like material.

21. An easy-to-manufacture, easy-to-use disposable pet diaper comprising:
   a lightweight upper portion;
   an absorbent bottom portion;
   means for securely attaching the diaper to a pet, said means for attaching comprising:
      a left slit and a right slit on the bottom portion of the diaper; and
      an elongated strip on each side of the upper portion of the diaper to be inserted through said left slit and said right slit of the bottom portion;
   means for holding the diaper around the pet's tail; and
   layered means for absorbing generally liquid discharge of the pet, whereby the diaper closely conforms to the contours of the pet's body; and
   wherein the pet diaper comprises a unitary, one-piece construction.

22. The pet diaper of claim 21, wherein the elongated strip on each side of the upper portion of the diaper comprises a left elongated strip and a right elongated strip connected to the upper portion of the diaper.

23. The pet diaper of claim 21, wherein:
   the left elongated strip of the upper portion of the diaper is inserted through the corresponding left slit of the bottom portion;
   the right elongated strip of the upper portion of the diaper is inserted through the corresponding right slit of the bottom portion; and
   the left and right elongated strips pulled to the back of the pet and are tied together or otherwise fastened to securely attach the diaper to the pet.

24. The pet diaper of claim 23, wherein the elongated strip is partially detachable from the diaper.

25. The pet diaper of claim 21, wherein the strips are passable through diagonally opposing, rather than corresponding, slits in the bottom portion of the diaper.

26. The pet diaper of claim 25, wherein the strips are capable of being fastened together.

27. The pet diaper of claim 21, wherein said means for holding the diaper around the pet's tail comprises an aperture passing through the upper portion of the diaper for accommodating said pet's tail, which will pass through said aperture.

* * * * *